(12) United States Patent
Wilbur et al.

(10) Patent No.: US 8,122,110 B1
(45) Date of Patent: Feb. 21, 2012

(54) ACTIVE CONFIGURATION TEMPLATING

(75) Inventors: Greg Wilbur, Ottawa (CA); Can Aysan, Kanata (CA)

(73) Assignee: Rockstar Bidco, LP, New York, NY (US)

( * ) Notice: Subject to any disclaimer, the term of this patent is extended or adjusted under 35 U.S.C. 154(b) by 755 days.

(21) Appl. No.: 11/427,887

(22) Filed: Jun. 30, 2006

(51) Int. Cl.
*G06F 15/177* (2006.01)

(52) U.S. Cl. .......... 709/221; 709/220; 709/223

(58) Field of Classification Search .......... 709/220, 709/221, 223
See application file for complete search history.

(56) References Cited

U.S. PATENT DOCUMENTS

| | | | | |
|---|---|---|---|---|
| 6,349,306 | B1 * | 2/2002 | Malik et al. | 707/103 R |
| 7,411,915 | B1 * | 8/2008 | Spain et al. | 370/250 |
| 7,457,853 | B1 * | 11/2008 | Chari et al. | 709/220 |
| 2005/0289388 | A1 * | 12/2005 | Black-Ziegelbein et al. | 714/7 |
| 2006/0026267 | A1 * | 2/2006 | Godin et al. | 709/220 |
| 2007/0107041 | A1 * | 5/2007 | Kayashima et al. | 726/1 |
| 2007/0168965 | A1 * | 7/2007 | Zenz et al. | 717/121 |
| 2007/0226224 | A1 * | 9/2007 | Wanigasekara-Mohotti et al. | 707/10 |
| 2008/0005344 | A1 * | 1/2008 | Ford et al. | 709/230 |
| 2008/0306793 | A1 * | 12/2008 | Berstis et al. | 705/7 |

\* cited by examiner

*Primary Examiner* — John Follansbee
*Assistant Examiner* — Nghi Tran
(74) *Attorney, Agent, or Firm* — Mukundan Chakrapani; Borden Ladner Gervais LLP

(57) ABSTRACT

There is provided a configuration management system for a network device, said network device including one or more sub-systems for implementing network services, said system comprising a configuration management interface in communication with an external configuration management agent; a sub-system interface in communication with said one or more sub-systems; a control entity for establishing configuration elements based on a previously stored template, said template including a set of defined values; and a subscription sub-system for sending a specification for implementing a service determined by each configuration element to said sub-system interface; wherein when one of said set of defined values is updated, said control entity updates all of said configuration elements based on said previously stored template.

22 Claims, 4 Drawing Sheets

ACTIVE CONFIGURATION TEMPLATING

FIELD OF THE INVENTION

The present invention relates generally to communication networks. More particularly, the present invention relates to a method and system of active configuration templating.

BACKGROUND OF THE INVENTION

As will be apparent to one skilled in the art of network design and management, configuration elements within the devices forming the network must be provisioned and managed if the network is to function properly.

One known way to provision elements within a network device is on an element-by-element basis, where each provisioning element represents the configuration datum for a specific local entity within the device (e.g., an interface, or service, or protocol). This approach is very time consuming, however, and requires many interactions between an external provisioning agent (i.e. operational support system or human operator) and the network device's configuration management system. Such methods of provisioning are particularly impractical for devices in which there can be hundreds of thousands of elements.

Furthermore, provisioning many instances of the same type of element is not uncommon when configuring a network device. Moreover, many of the configuration elements may operate in accordance with default values, which are predetermined for the network. However, in order to update all of these configuration elements when a default value is updated is quite time consuming.

One prior art method of creating configuration elements is disclosed in co-owned pending application Ser. No. 11/237,728 entitled SYSTEM AND METHOD FOR PROVISIONING AND MANAGING CONFIGURATION ELEMENTS, which is hereby incorporated by reference.

Some prior art systems rely on using template systems, however, in order for specific configuration elements to be templated, they must be completely modeled as the templates do not re-use an existing model of a configuration element. This requires extra processing time to perform. Furthermore, the configuration values, which are based on existing templates, do not include sufficient information to allow differentiating between template default values and user provided values.

Other solutions, in an off-network EMS or OSS based solution, are also known but suffer from various problems such as that they require that the specific configuration elements being templated must also be modeled; the scalability of the solution is limited by the performance of the off-network system; the reliability based on off-network poll of all configuration elements followed by a push results in a slower response to configuration element recovery; write authorization is required on the OSS for all configuration elements; and since the target is a slave, autonomous decisions are not possible.

It is, therefore, desirable to provide a novel method of creating and updating configuration elements from a configuration element, which is a template instance.

SUMMARY OF THE INVENTION

It is an object of the present invention to obviate or mitigate at least one disadvantage of previous methods and systems of creating and updating configuration elements.

An aspect of the invention provides a system and method of updating configuration elements which have been created based on a template. The template typically includes a set of defined values for various parameters. The configuration element, which is based on this template, inherits the template's values as their defined values. However, configuration elements may be modified so that the parameter values are not the defined value. Preferably, when the defined values of the template are updated, subsequent updates are performed on the configuration elements.

Preferably, each configuration element includes an identification of which template, or templates, it is based on so that when a template is updated, the configuration element is automatically updated with the new defined value. In another aspect of the invention, in order to protect modified parameter values in the configuration element, the configuration element is updated only when its corresponding parameter value has not been modified from the defined value.

In a further aspect of the invention, there is provided a configuration management system for a network device, the network device including one or more sub-systems for implementing network services, the system comprising a configuration management interface in communication with an external configuration management agent; a sub-system interface in communication with the one or more sub-systems; a control entity for establishing configuration elements based on at least one template the at least one template including a set of default values; and a specification sub-system for sending a specification for implementing a service determined by each configuration element to the sub-system interface; wherein when at least one of the set of default values in a template is updated, the control entity updates all of the configuration elements based on the template.

In another aspect, there is provided a computer program product comprising one or more computer-readable media having stored thereon computer executable instructions that, when executed by a processor within a router, implements a configuration management system comprising a configuration management interface in communication with an external configuration management agent; a sub-system interface in communication with the one or more sub-systems; a control entity for establishing configuration elements based on at least one template, the at least one template including a set of default values; and a specification sub-system for sending a specification for implementing a service determined by each configuration element to the sub-system interface; wherein when at least one of the set of default values in a template is updated, the control entity updates all of the configuration elements based on the template.

In yet a further aspect, there is provided a method of updating configuration elements in a network device comprising: the steps of creating at least one configuration element based on at least one template, the at least one configuration element including configuration element parameter values corresponding to a set of template parameter default values in the at least one template; sensing an update of at least one of the set of template parameter default values; updating the configuration element parameter values based on the update of the template parameter default values.

The present invention provides increased efficiency in configuring network systems and maintaining the network system as configurations within the network change.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for active configuration templating.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Figure 1:
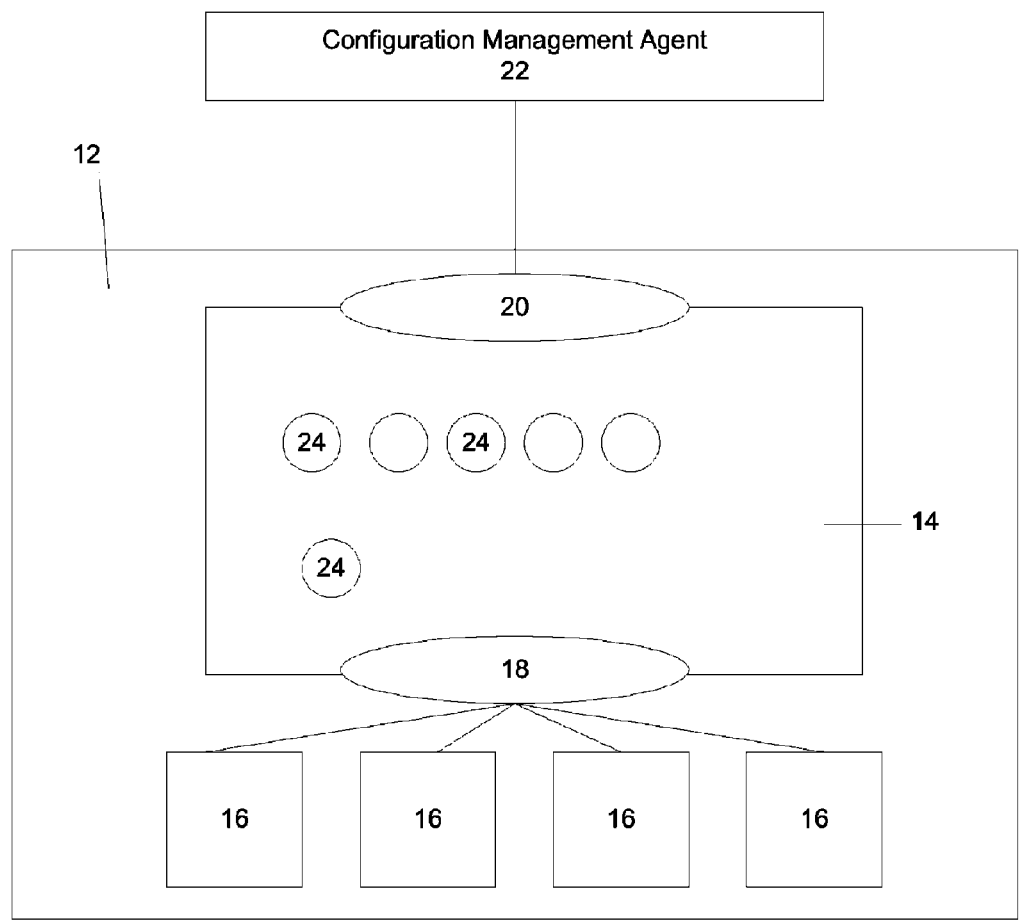
FIG. 1 is a block diagram of a network device in accordance with an embodiment of the invention.

Turning to FIG. 1, a schematic diagram of a network environment according to an embodiment of the invention within which the present invention operates is shown. The network environment 10 comprises a network element, which in this example is a router 12 including a configuration management system 14 and support subsystems 16. An application programmer's interface (API) 18 interfaces the sub-systems 16 with the configuration management system 14 while a configuration interface 20 performs similar functionality for a configuration management agent 22.

Configuration management agent 22 may include an external user interface or system which configures and manages router 12, and by way of example, may include an external element management system or a network provider's operational support system. The configuration management agent 22 may also be referred to as a provisioning agent.

Within the configuration management system 14 is a plurality of configuration elements 24. In order to monitor and/or track all of the configuration elements 24, each of the elements contains identifying information.

Figure 2:
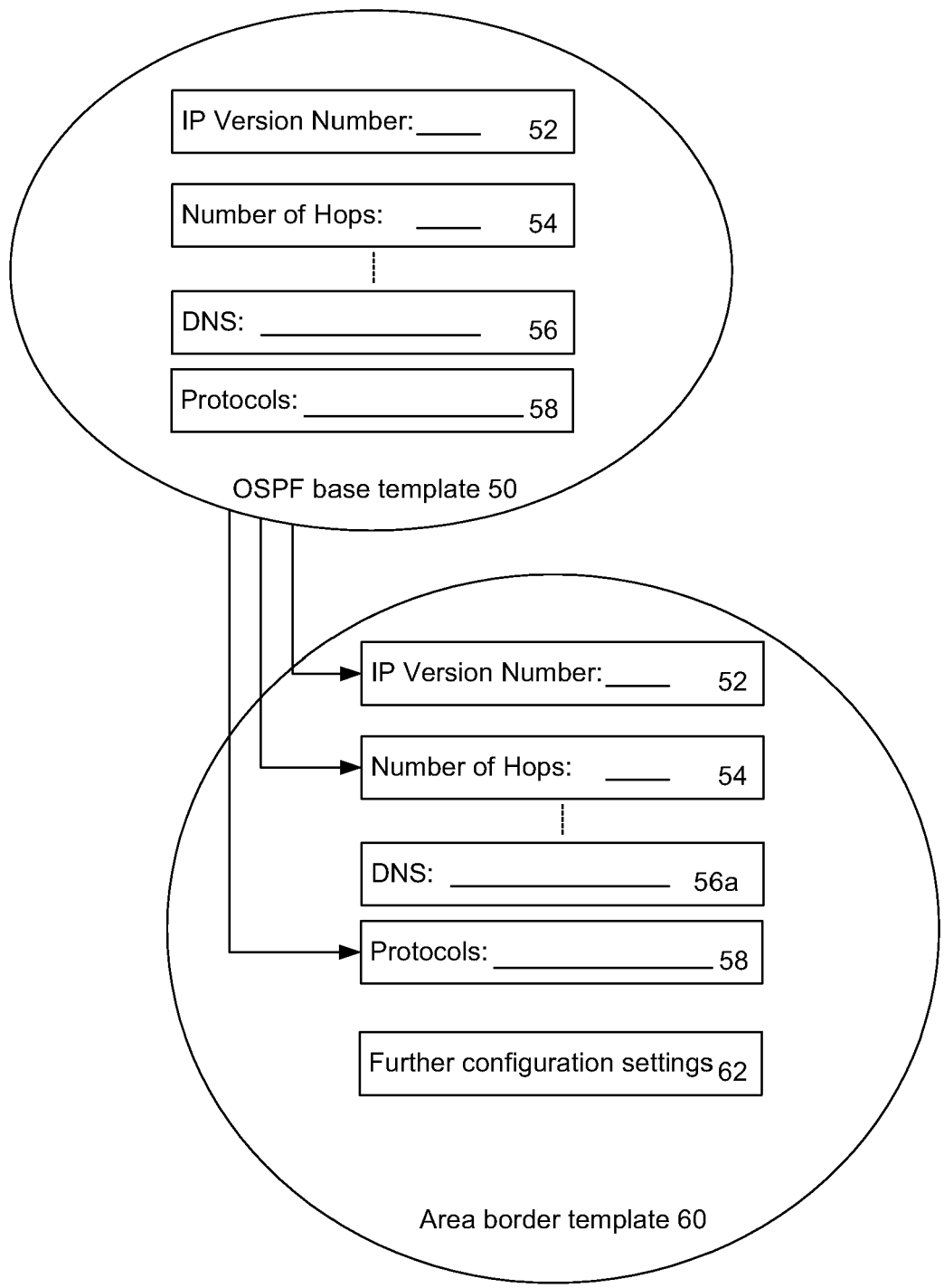
FIG. 2 is a view of configuration elements which are used as templates.

Turning to FIG. 2, a schematic view of linked templates is provided. Templates are typically used to group similar configuration settings together. Thus, in one example, the Open Shortest Path First (OSPF) routing configuration is maintained in a template 50. A base OSPF template 50 may contain configuration elements pertaining to the IP version number 52, the number of acceptable hops 54, the Domain Name Server (DNS) 56 that will be used, and a list of protocols that will be handled 58. Based on this template, other templates can be generated, and are considered to be linked to the first template. Specific templates can be created for area border routers, autonomous system boundary routers, internal routers, etc. Each of these templates can be linked to the base template, can add other configuration elements and can set a new default for a configuration value.

Thus, the base OSPF routing template 50 can specify a particular DNS 56. When a new template is created based on the base template, for example internal router template, the internal router template will be linked to the base template 50, and without further modification will accept the default values in the OSPF base template 50. If the OSPF base template 50 is modified to change the specified DNS 56, the value of the DNS in the internal router template will also be updated. However, for another template, such as the area border router template 60, it may be desired to specify a different DNS 56a in a particular implementation. Area border router template 60 has values 52, 54, and 58 linked to the defaults established in OSPF base template 50, but does not link to the DNS value 56 defined in the base template 50 (as illustrated by the arrows connecting the OSPF base template 50 with configuration values 52, 54 and 58 showing flow of updated configuration data). Additional configuration values 62 can also be specified. In this case, when the DNS 56 is changed in the base OSPF template, the change will not be propagated to DNS 56a of the area border router template 60 as the area border router template will have a defined value 56a as opposed to the default value (the value defined for the base OSPF template).

One skilled in the art will appreciate that further templates can be based on the area border template 60, and changes to default values can be propagated through the entire linked chain of templates starting with the base template 50. When templates are linked to other templates, it is important to ensure that the linkages are defined in a linear fashion, and do not permit circular links. In embodiments of the present invention, checking is applied to templates to ensure that circular linking is not performed.

Figure 3:
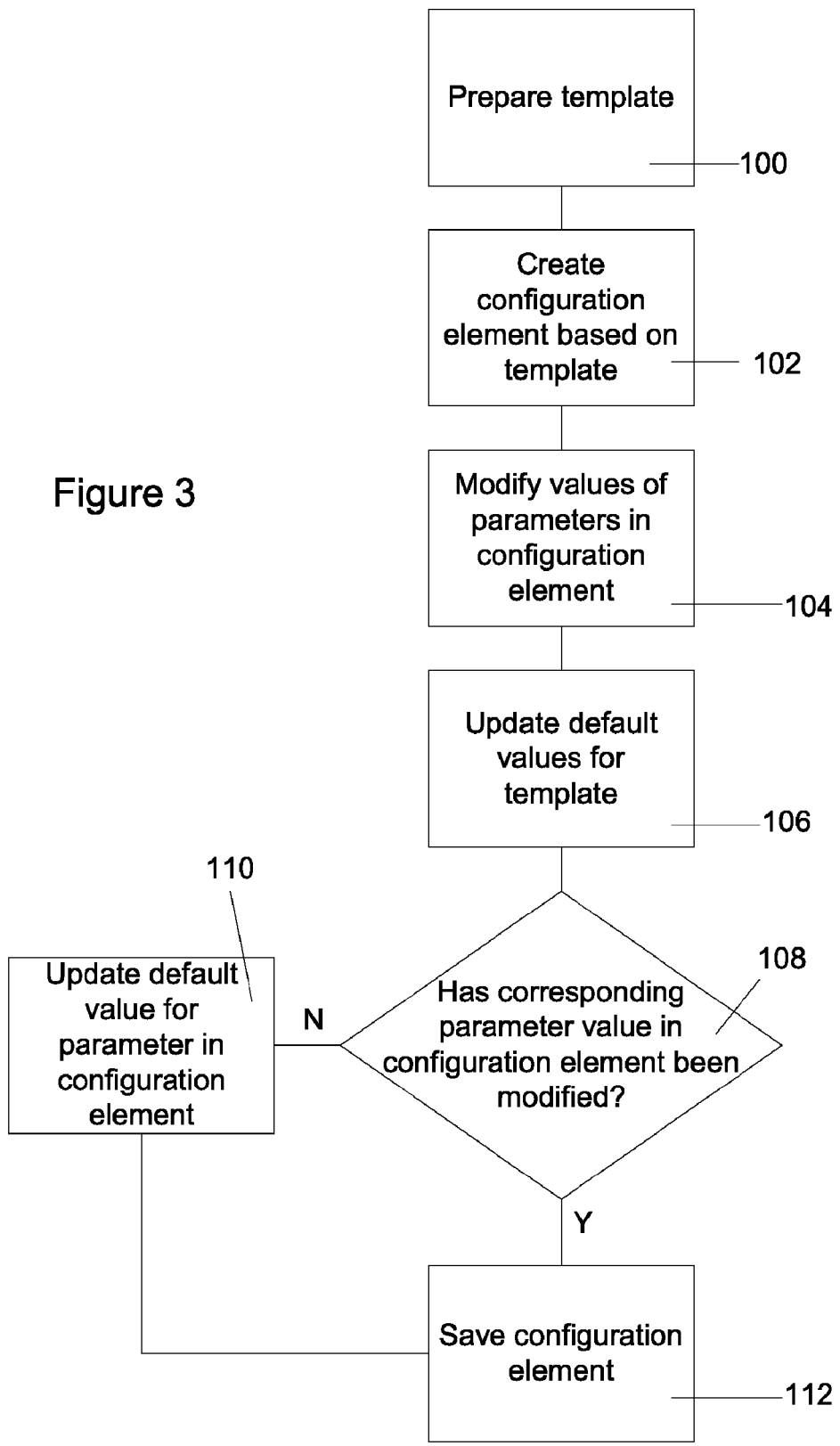
FIG. 3 is a flow chart of a first embodiment method of active configuration templating.

Turning to FIG. 3, a method of creating and updating a configuration element (from a perspective of the configuration management system) according to an embodiment is shown. Initially, a template is prepared (step 100) and stored within memory in the configuration management system. The template is marked via a template identification marker and includes defined configuration parameters for at least one configuration element of the configuration system. The template includes relevant information concerning configuration elements along with a set of defined values for a pre-determined list of parameters such as shown in FIG. 2. When a new configuration element is required, the new configuration element is created which is typically based on the one or more templates (step 102). The new configuration elements include a template associated marker to identify the template on which the new configuration element is based. It will be understood that this template may further be associated or based on another template which allows the new configuration element to be based on multiple templates. The new configuration element is created with the parameters set to the defined values. These parameters may be modified to reflect that the configuration element is not operating using defined values with respect to various parameters. It will be understood that any or all of these parameters may be amended in accordance with user specifications (step 104)

After the configuration element is created, it is saved in the memory of the configuration management system 14 and the information is available to the sub-systems 16. During operation, the defined values of a parameter in the template or templates on which the configuration element is based may be modified (step 106). When this occurs, the configuration management system determines which of the configuration elements were created based on the template, for example, by searching for all template associated markers. Once the list of configuration elements has been determined, all of the configuration elements are updated to reflect the new defined value. It will be understood that a further check is performed to determine if the parameter (corresponding to the updated defined value) has previously been changed for any given configuration element, for example by an operator provisioning a change for a particular element. If this parameter value has been previously modified, such that the parameter value is not the defined value, the parameter value is not updated with the new defined value (step 108). Of course, an operator can choose to allow such a change, depending on their preferences.

It will be understood that this extra step of checking may be performed for all the configuration elements before they are updated so that the configuration elements which do not need updating are removed from the list. In another alternative embodiment, the check may be performed while the configuration element is being updated so that individual checks are performed on all of the configuration elements which were created based on the template After the configuration elements are updated or found to not require updating, they are stored back into memory (step 112).

It will be understood that the defined values of a template such as template 50 may be updated directly in the template or may be updated via an associated template. As shown in FIG. 2, the parameter 58 for the protocols supported is part of OSPF base template 50 and area border template 60 such that the parameter is linked in the two templates. Therefore, when the default value for this parameter is updated in template 50 it is updated in template 60 and in all network elements that have been based on one of these templates and that accepted the default value.

Furthermore, even though the configuration elements may be modified at one point to reflect a new value for a parameter, if it is desired, the configuration management system may also delete the configuration element as a mechanism to return the parameter to the defined value.

Also, the configuration element may be modified so that the parameter value is marked as user modified so that any updates to the defined value will not affect the configuration element. For example, if the defined value for the SPF-delay in the OSPF template is 1000, during configuration the default can either be accepted or overridden. If the configuration of a particular network element requires that the value be fixed at 1000, the defined value of 1000 can be replaced with a user modified value of 1000 and the configuration element then operates with this at all times and will not be updated when the defined value is updated. Thus, during configuration, the SPF-delay parameter, or any other parameter, can be specified so that it remains constant and is not modified by an updated defined value.

Alternatively, the updated template value is transmitted to each of the configuration elements. If the configuration element has maintained the defined value, the parameter is updated to reflect the new defined value. However, if the parameter has been modified, the new defined value is calculated so that if the parameter is modified to return to the defined value, the configuration element has access to the updated defined value.

Figure 4:
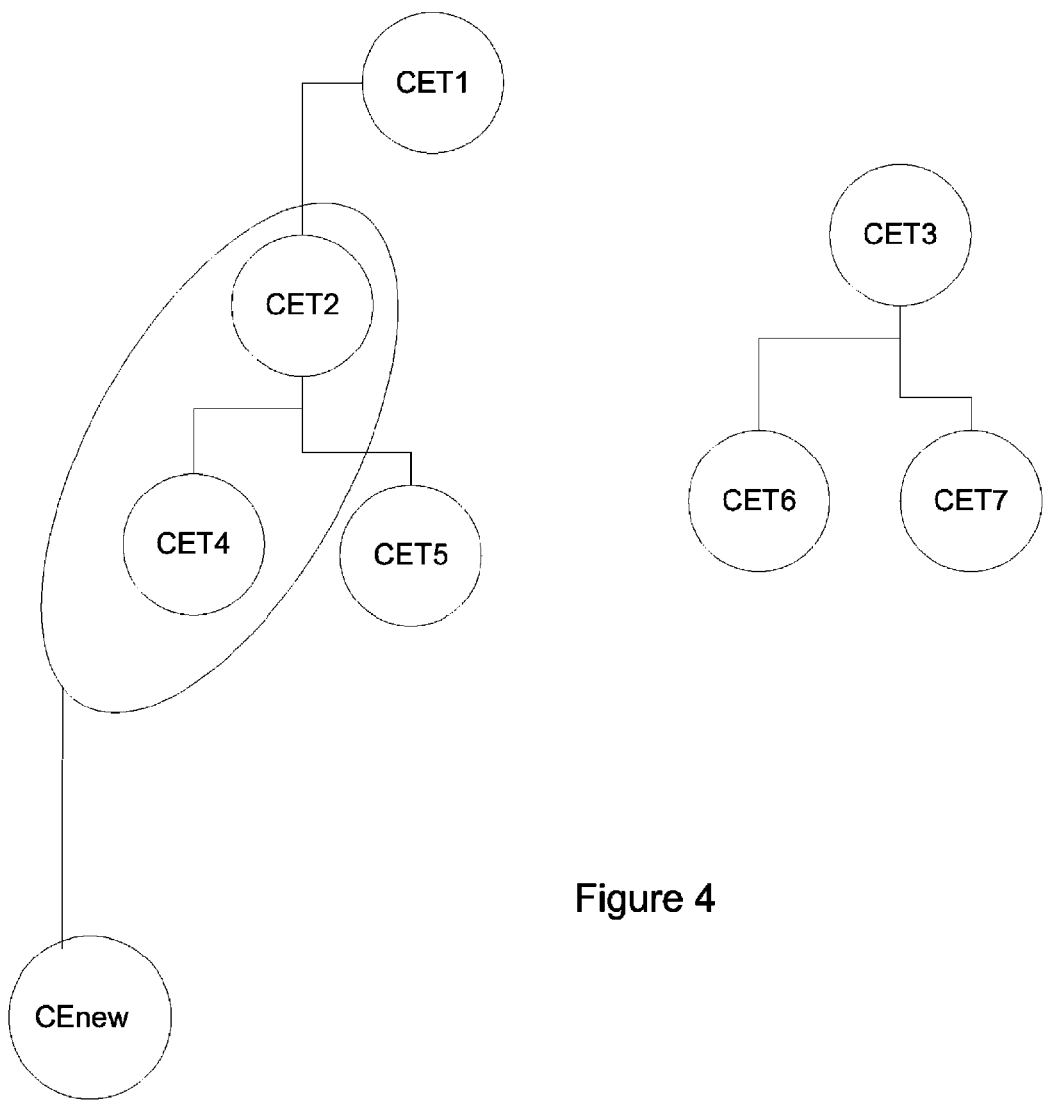
FIG. 4 is a view of configuration elements in a second embodiment of the invention.

In an alternative embodiment as shown in FIG. 4, multiple configuration elements templates (CET1, CET2, CET3, CET4, CET5, CET6 and CET7) may be already created which form the basis of a plurality of templates from which new configuration elements may be created. As shown in FIG. 4, configuration element templates CET1, CET2, CET4, and CET5 form one linkage while configuration element templates CET3, CET6 and CET7 form a second linkage. As disclosed above, the configuration element templates each include a template identification marker. This marker allows the configuration management system to identify (when updates are made), which updates to template defined values are to be adopted.

A new configuration element (CEnew) may be created and linked to one or more of these configuration element template which of course may be linked to other templates in a non-circular dependency.

In this example, when the configuration element templates CET1 and CET3 are initially created, their parameters are assigned values and both are marked as templates by a template identification marker. When other configuration element or configuration element templates are created based on CET1 and CET3, they initially receive the values from the template(s) as defaults, or pre-defined values, on which they are based, with the opportunity to add new parameters as well.

Therefore, for example, if CEnew is created based on CET4, CEnew is assigned the defined values for all the parameters in CET4, some of which may be adopted from CET2 or CET1 and then may add new parameters as well. CEnew also receives a template associated marker to identify the templates on which CEnew is based. It will be understood that CEnew may also be a template (which would require a further template identification marker), or it may simply be configuration element based on CET4. If CEnew is a template, it is added to the system. However, if CEnew is a configuration element, it must be semantically correct (include all the parameters) before it can be stored in the configuration management system.

Therefore, when there is an update to any of the defined values of the parameters in CET4 and/or CET2, these updates are transmitted to CEnew (whether it is a configuration element or a template). The configuration management system receives the update and checks to see if the parameter value (associated with the updated defined value) is at the defined value or a modified value in CEnew. If this parameter value has been modified, the change in defined value is noted but no update is performed. Otherwise, if CEnew still has the defined value for the parameter, the value is updated to reflect the new defined value.

An advantage of these approaches is that the template identification marker allows the templates to be stored in the configuration management system without having to be semantically correct. An advantage of these approaches is that the configuration management system may create templates for any desired configuration elements without having to re-model the configuration element as a template. Furthermore, by basing configuration elements on templates, inheritance between configuration elements is better tracked and allows for changes in values to be easily updated in all the associated configuration elements.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A computer-implemented configuration management system for a network device, said network device including one or more sub-systems for implementing network services, said system comprising:
   a control entity establishing configuration elements based on at least one template, said at least one template including a set of parameters and a corresponding set of defined values;
   a memory storing said configuration elements;
   a specification sub-system sending a specification for implementing a service determined by each configuration element to said sub-systems; and
   an update sub-system determining modified and unmodified parameter values, said unmodified parameter values corresponding to said set of defined values, and automatically updating only unmodified parameter values of said configuration elements in response to at least one common defined value in a linked template being updated, while protecting said modified parameter values of said configuration elements in said at least one template.

2. The configuration management system of claim 1 further comprising a configuration management interface for communication with an external configuration management agent.

3. The configuration management system of claim 1 further comprising a sub-system interface for communication with said one or more sub-systems and wherein said specification sub-system sends said specification to said sub-systems via said sub-system interface.

4. The configuration management system of claim 1 wherein each of said configuration elements is updated if said at least one of said set of defined values in said configuration element has not been modified.

5. The configuration management system of claim 1 wherein said control entity further comprises:
   a search engine for determining which of said configuration elements are based on said template.

6. The configuration management system of claim 1 wherein said control entity further comprises:
   a comparator for determining if said at least one of said set of defined values in said configuration elements has been modified; and
   a module for updating the defined values of said configuration elements where said at least one of said set of defined values has not been modified.

7. The configuration management system of claim 1 wherein said at least one of said set of defined values in the template is updated directly within the template.

8. The configuration management system of claim 1 further comprising:
   a template identification marker for identifying templates; and
   a template associated marker for each of said configuration element identifying which template each configuration element is based on.

9. A router comprising a configuration management system as claimed in claim 1.

10. The configuration management system of claim 1, wherein the at least one template is a group of templates linked in a non-circular dependency.

11. The configuration management system of claim 10, wherein said system automatically propagates updates made to one defined value associated with a parameter in one of said group of templates to all other linked templates that include said one defined value.

12. The configuration management system of claim 1 wherein the at least one template includes at least one additional user-specified parameter that is not linked to the linked template.

13. A computer program product comprising one or more non-transitory computer-readable media having tangibly stored thereon computer executable instructions that, when executed by a processor, implements a configuration management system comprising:
   a control entity for establishing configuration elements based on at least one template, said at least one template including a set of parameters and a corresponding set of defined values;
   a specification sub-system for sending a specification for implementing a service determined by each configuration element to said sub-systems;
   an update sub-system for determining modified and unmodified parameter values, said unmodified parameter values corresponding to said set of defined values, and for automatically updating only unmodified parameter values of said configuration elements in response to at least one common defined value in a linked template being updated, while protecting said modified parameter values of said configuration elements in said at least one template.

14. The computer program product of claim 13 wherein said control entity further comprises:
   a search engine for determining which of said configuration elements are based on said linked template.

15. The computer program product of claim 13 wherein said control entity further comprises:
   a comparator for determining if said at least one of said set of defined values in said configuration elements has been modified; and
   a module for updating the defined values of said configuration elements where said at least one of said set of defined values has not been modified.

16. The computer program product of claim 13 wherein said at least one of said set of defined values in said at least one template is updated directly within said at least one template.

17. The computer program product of claim 13 further comprising:
   a template identification marker for identifying templates; and
   a template associated marker for each of said configuration element identifying which template each configuration element is based on.

18. The computer program product of claim 13, wherein the at least one template is a group of templates linked in a non-circular dependency.

19. The computer program product of claim 18, wherein said update system automatically propagates updates made to one defined value associated with a parameter in one of said group of templates to all other linked templates that include said one defined value.

20. The computer program product of claim 13 wherein the at least one template includes at least one additional user-specified parameter that is not linked to the linked template.

21. A method of updating configuration elements in a network device comprising: the steps of:
creating at least one configuration element based on at least one template, said at least one configuration element including configuration element parameter values corresponding to a set of template parameter defined values in said at least one template;
determining modified and unmodified parameter values, said unmodified parameter values corresponding to said set of template parameter defined values;
sensing an update of at least one of said set of template parameter defined values;
automatically updating only said unmodified configuration element parameter values in response to the update of said template parameter defined values, while protecting said modified parameter values of said at least one configuration element in said at least one template.

22. The method of claim 21 wherein said update is stored in the configuration element when said configuration element parameter value has not been previously modified.

* * * * *